United States Patent [19]

Chiu

[11] 3,892,668
[45] July 1, 1975

[54] DIGESTED ALKALINE TALL OIL PITCH SOAP COMPOSITION

[75] Inventor: Ying C. Chiu, Houston, Tex.

[73] Assignee: Shell Oil Company, Houston, Tex.

[22] Filed: Mar. 5, 1974

[21] Appl. No.: 448,236

Related U.S. Application Data

[60] Division of Ser. No. 351,738, April 16, 1973, Pat. No. 3,823,774, and a continuation-in-part of Ser. Nos. 235,039, March 15, 1972, abandoned, and Ser. No. 235,088, March 15, 1972, abandoned.

[52] U.S. Cl............ 252/8.55 D; 166/252; 166/275; 252/352; 252/356; 252/369; 252/370; 260/97.5; 260/99.5; 260/105
[51] Int. Cl.$^2$.................. C11D 15/04; E21B 43/20
[58] Field of Search........ 166/273, 274, 275, 305 R; 252/8.55 B, 369, 370, 8.55 D, 352; 260/97.5, 105, 99.5

[56] References Cited
UNITED STATES PATENTS

| | | | |
|---|---|---|---|
| 3,191,676 | 6/1965 | Froning | 166/275 |
| 3,303,879 | 2/1967 | Williams | 166/275 |
| 3,330,344 | 7/1967 | Reisberg | 166/275 |
| 3,336,221 | 8/1967 | Ralston | 252/8.55 X |
| 3,498,379 | 3/1970 | Murphy | 166/275 |
| 3,688,844 | 9/1972 | Roszelle | 166/274 |
| 3,731,741 | 5/1973 | Palmer et al | 166/275 |

*Primary Examiner*—Herbert B. Guynn
*Attorney, Agent, or Firm*—H. W. Coryell

[57] ABSTRACT

The oil in a subterranean reservoir is advantageously displaced by injecting into the reservoir an aqueous surfactant system containing a digested alkaline tall oil pitch soap composition produced by heating a mixture of tall oil pitch and an excess of aqueous base for a time and temperature that yields a substantially completely water soluble digestion product.

9 Claims, 5 Drawing Figures

TEST 1 SOLUTION PREPARED WITHOUT DIGESTION (PRIOR ART)
TEST 2 SOLUTION PREPARED WITH DIGESTION

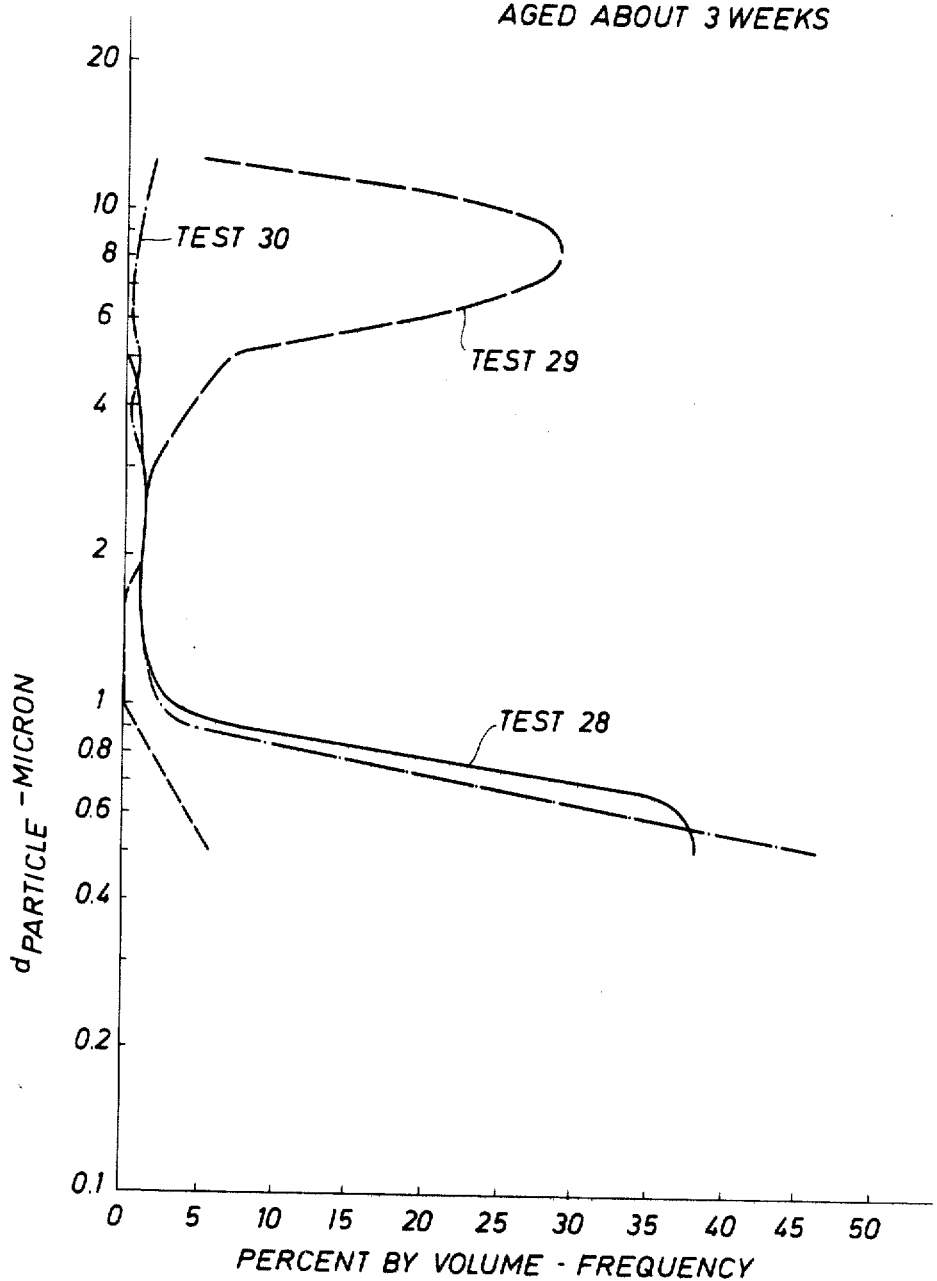

019,668

DIGESTED ALKALINE TALL OIL PITCH SOAP COMPOSITION

RELATED PATENT APPLICATIONS

This application is a division of application Ser. No. 351,738, filed Apr. 16, 1973, now U.S. Pat. No. 3,823,744 and a continuation-in-part of applications Ser. No. 235,039, filed Mar. 15, 1972, now abandoned, and Ser. No. 235,088, filed Mar. 15, 1972, now abandoned.

BACKGROUND OF THE INVENTION

This invention relates to an improved oil recovery and/or well treatment process in which oil located within a subterranean reservoir is displaced from one location to another by injecting an aqueous surfactant system into the reservoir.

In prior processes, various aqueous surfactant systems have been injected into subterranean reservoirs to effect well treatments such as displacing oil away from a well to improve the water injectivity or to facilitate oil recovery processes by displacing oil away from fluid injection locations toward fluid production locations or the like.

In such treatments or processes, the relative cost of the oil displacing step is critical. If the oil displacement cost significantly increases the cost of the oil that is produced (relative to oil that is obtainable by other means) the oil displacement process is economically unfeasible.

As known to those skilled in the art, an aqueous surfactant system is most efficient with respect to displacing oil when it is an "active" surfactant system in which the type and concentration of surfactants and electrolytes are adjusted so that the interfacial tension between the surfactant system and the oil to be displaced is less than about 0.01 dyne per centimeter. In forming an active aqueous surfactant system, it is generally advantageous to use anionic surfactants and/or mixtures of surfactants that consist essentially of anionic surfactants. The anionic surfactants tend to provide a relatively high degree of interfacial tension lowering activity at a relatively low cost. However, anionic surfactants, particularly when they comprise or contain alkali metal or ammonium salts of fatty acids, are disadvantageously subject to precipitation and/or gelation by dissolved salts of multivalent cations; particularly the alkaline-earth metal cations, which are commonly encountered in subterranean reservoirs.

Tall oil pitch is a byproduct of the Kraft process for making paper. In that process, wood chips are digested in sodium hydroxide to release wood pulp. The resulting aqueous liquid phase contains sodium soaps of fatty acids, rosin acids, lignin, and other solubilized organic materials. The aqueous phase is processed to yield tall oil fatty acids, tar, tall oil, rosin, tall oil heads; and, the distillation residue, tall oil pitch. The tall oil pitch contains fatty acids, rosin acids, and esters of such acids. It is approximately one-third unsaponifiable organic material.

Prior oil-displacement uses of tall oil pitch soaps have utilized various alkali metal and/or ammonium salts of the crude or refined acids that are contained in the tall oil pitch. Substantially neutral or acidic tall oil pitch soaps can be formed by simply mixing the pitch with a substantially stoichiometric amount (based on the acid number of the pitch), or a smaller amount of an aqueous alkali (i.e. a basic aqueous liquid). For example, U.S. Pat. No. 3,303,879, suggests the use of a "viscoelastic" oil-displacing aqueous solution that contains less than about 1% by weight of such soaps of relatively pure tall oil acids. U.S. Pat. No. 3,330,344, by J. Reisberg, describes an aqueous surfactant system in which a partially neutralized tall oil pitch is used to provide surfactant soap micelles that are swollen by amphiphilic materials comprising the unneutralized tall oil acids and unsaponified organic materials. In such processes, the tall oil pitch soaps are formed by simply mixing an aqueous alkaline solution with the tall oil pitch, and/or purified tall oil acids, before or after the pitch or acids or soaps are dispersed or dissolved in water to form an aqueous surfactant system.

The soap solutions and/or dispersions that are formed by such procedures have disadvantages relative to their use in subterranean reservoirs. They tend to contain enough suspended solid components to significantly impede the flow of fluid within a subterranean reservoir.

Particularly in an oil recovery process, the injectibility of a surfactant system is a critical aspect of the process. For example, an injection well receiving 1,000 barrels per day of a fluid that contains one part per million of suspended solids, would receive 100 pounds of solids in one year. Because of this, the filterability of an aqueous surfactant system is an important element.

With respect to all oil pitch soap surfactant systems produced by the prior procedures, in general, a successful filtration can only be effected after a significant amount of heating, such as a heating to 160°F. With the amount of aqueous surfactant system needed in an oil recovery process, such a hot fluid filtration involves a significant expense.

SUMMARY OF INVENTION

The present invention relates to an improvement in a process in which oil located within a subterranean reservoir is displaced from one location to another by injecting an aqueous surfactant system into the reservoir. It also relates to a digested alkaline tall oil pitch soap composition adapted for use in such an improved process. In the present process, water soluble surfactants and electrolytes are dissolved in an aqueous liquid to form an active surfactant system in which the surfactants consist essentially of a digested alkaline tall oil pitch soap composition produced by heating a mixture of tall oil pitch and excess aqueous alkali for a time and temperature that is productive of a substantially completely water soluble digestion product. The so-formed aqueous surfactant system is injected into the reservoir to contact and displace the oil.

DESCRIPTION OF THE INVENTION

Figure 2:
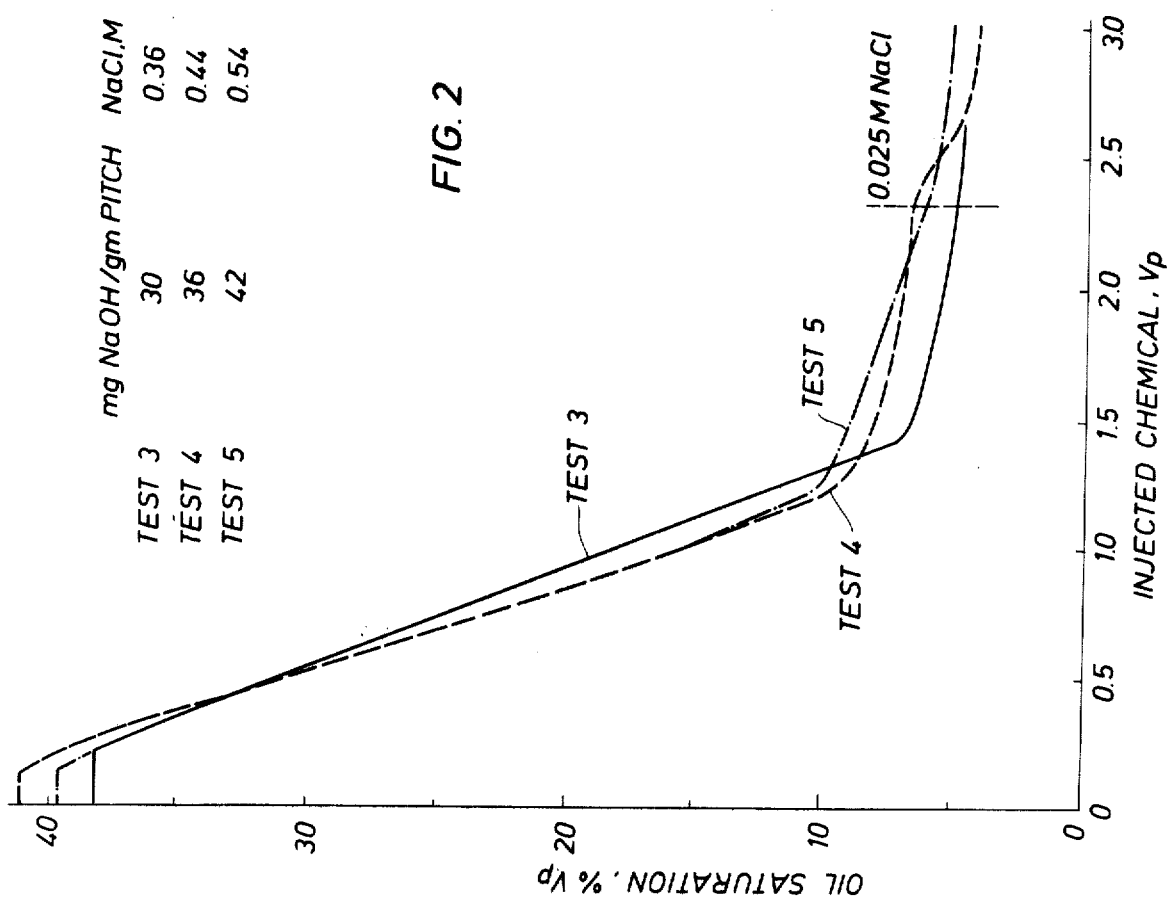
FIGS. 2, 3 and 4 are plots of oil saturation with amount of fluid injected. And, FIG. 5 is a plot of particle-size distribution.

The invention is, at least in part, based on a discovery that when a mixture of tall oil pitch and excess aqueous alkali is digested under conditions of concentration, temperature and duration that increase the water-solubility of the digestion product, the latter is a digested alkaline tall oil pitch soap composition that is distinctly different and has a significantly greater tolerance to multivalent cations than an otherwise similar tall oil pitch soap that contains less alkali or received a less severe digestion.

The tall oil pitch used in the present invention can be substantially any of such products that are commercially available. Examples of suitable tall oil pitches include Acintol Pitch from Arizona Chemical Company; Pamak TP from Hercules Chemical company; Unitol DP, from Union-Camp Company; Glidden-Durke Glidden Pitch; Emtall 906 from Emery Industries; etc.

The aqueous alkali used in this invention can comprise substantially any water solution of a basic or alkaline material that is substantially free of multivalent cations that form water-insoluble salts of fatty acids. At least moderate amounts of substantially neutral electrolytes, such as the sodium or potassium halides, that are substantially free of multivalent cations can be dissolved in the aqueous alkali used in this invention.

The amount of aqueous alkali (i.e., aqueous alkaline liquid solution) that is mixed with the tall oil pitch is, in parts by weight, preferably from about one to five parts of aqueous alkali per part of pitch. The proportion of basic or alkaline salt that is dissolved in the aqueous alkali is preferably equivalent to a proportion of sodium hydroxide which (in the amount of aqueous alkali that is mixed with the pitch) is from about 20–80% more than a stoichiometric equivalent based upon the acid number of the pitch.

The digestion conditions, i.e., the temperature, duration and concentration conditions under which the mixture of tall oil pitch and aqueous alkali is heated or digested, should be adjusted to impart a substantially total water solubility to the products of the heating (i.e., the present digested alkaline tall oil pitch composition).

As known to those skilled in the arts, such a heating or digestion effects saponification reactions between the aqueous alkali and the tall oil pitch. The rate and/or extent of such reactions are responsive to the amount of the aqueous alkaline liquid per part of pitch, the concentration of the aqueous alkali, the amount of alkali per part of pitch the reaction temperature, the reaction duration, and the like. For example, in a typical mixture of about equal parts of pitch and an aqueous alkali that contains about 5% weight sodium hydroxide, a digestion time and temperature significantly less than about four hours (e.g., such as less than ½ hour) at 70°C., fails to cause a sufficient increase in the water solubility and salinity tolerance (i.e., the resistance to precipitatio, etc., by dissolved salts of monovalent metals) that would be provided by an equal time at room temperature. Alternatively, a digestion time and temperature significantly greater than about 16 hours at 110°C. fails to cause a significant increase in the water solubility of the total product, because portions of the pitch become converted to water insoluble compounds.

Unobviously, when a mixture of tall oil pitch and excess aqueous alkali are digested under conditions that provide a substantially comletely water soluble digestion product, the salinity tolerance is materially increased relative to a similarly neutralized but not digested tall oil pitch soap. And, in addition, an aqueous surfactant system containing the present digested alkaline tall oil pitch soap composition is an efficient oildisplacing surfactant system. As will be apparent to those skilled in the art, for the relatively higher concentrations of alkali and pitch, the lower temperatures, or shorter durations, of digestion should be used. In general, the conditions that are suitable are recognizable as those that provide a significant increase in the water-solubility of the total digestion product relative to the water solubility of an undigested mixture of the same components.

The alkaline material with which the tall oil pitch is digested in the present process can advantageously comprise a mixture of alkali metal and/or ammonium hydroxides and/or such salts of relatively weak acids. Examples of suitable alkaline materials include sodium, potassium, lithium or ammonium hydroxides; such carbonates, phosphates, fluorides, borates, acetates (and/or other water soluble lower molecular weight carboxylic acid salts, such as the formates, propionates, oxalates, or the like). The properties of the present digested alkaline tall oil pitch soap compositions can be adjusted by adjusting the particular type and amount of water soluble alkali that is mixed with the tall oil pitch before the digestion and/or mixed with the digested pitch soap composition so that the alkali becomes dissolved in an aqueous surfactant system that contains the soap. Sodium hydroxide tends to provide the highest tolerance to the total dissolved salt content of a relatively soft water (i.e., salinity tolerance) but tends to provide less buffer action, less oil recovery and less multivalent cation tolerance than some of the other alkalies. In general, the oil recovery capability of such pitch soap compositions containing different alkalies, decreases throughout the series sodium carbonate, sodium phosphate, ammonium hydroxide, sodium hydroxide. The tolerance for salts of monovalent cations decreases throughout the series; sodium hydroxide, sodium phosphate, sodium carbonate, ammonium hydroxide. Particularly good multivalent cation tolerance is exhibited by such soap compositions containing sodium phosphate or sodium carbonate. The buffering capacity of such soap compositions decreases through the series sodium phosphate, sodium carbonate, ammonium hydroxide, sodium hydroxide. With the addition of sodium borate to sodium hydroxide during or after the digestion, the buffer capacity of the system is greatly increased.

Since the type of alkali used in neutralizing the tall oil pitch to form the digested alkaline pitch soap composition imparts different characteristics, it is advantageous to determine properties of the reservoirs and the environs in which the oil is to be displaced and adjust the alkaline material content of the soap composition and/or aqueous surfactant system to enhance the properties desired for the particular reservoir treatment. For example, the salt tolerance can be enhanced by using an alkaline material containing a significant proportion of a mixture of sodium carbonate and sodium hydroxide. In general, where the alkali used in forming the pitch soap composition is an alkaline salt (rather than hydroxide) the oil recovery property of an aqueous surfactant system of the soap (i.e., oil displacement efficiency), can be increased by adding sodium hydroxide before or after the digestion of the mixture of tall oil pitch and aqueous alkali) in an amount such that it becomes a significant proportion of the alkaline material content of the system.

Fatty acid dimerizing pre-treatments of the tall oil pitch can be utilized to modify properties of the present digested alkaline tall oil pitch soap compositions. In general, the free acids in tall oil pitch tend to be rosin acids. Although esterification reactions occur between the fatty acids and the alcohols during the fractionation of the crude tall oil, due to the steric hinderance of the carboxyl group in the rosin acids, their esterification is negligible. However, as known to those skilled in the art, by subjecting the tall oil pitch to relatively high temperatures and pressures, such as 260° under 300 psi, at least some of the fatty acids can be converted to dimers. The oil-displacing efficiency of the digested alkaline tall oil pitch soap compositions tends to increase with increases in the fatty acid dimer content of the tall oil pitch.

Alkali metal phosphates can advantageously be used as the aqueous alkali with which the tall oil pitch is digested and/or can be dissolved in the aqueous liquid in which the digested alkaline tall oil pitch soap composition is dissolved to form an aqueous surfactant system. In an aqueous solution, the ions of a water-soluble phosphate salt hydrolyze in stages to form divalent and multivalent phosphate ions containing, respectively, one and two hydrogen atoms. The degree of ionization depends on the pH of the solution and the concentration of the phosphate. Since the ionization constant of the hydrolysis from the tribasic phosphate ion is large, relative to that from the dibasic to the monobasic ion, an aqueous solution of pH 10 to 11 tends to contain mostly the $HPO_4^=$ and $H_2PO_4^-$ ions and tends to be a buffered solution that contains conjugated acid-base pairs. In an aqueous surfactant system in which the surfactant consists essentially of a digested alkaline tall oil pitch soap composition containing phosphate ions, the relatively high tolerance for multivalent cations may be related to a complex formation and/or ion-pair of formation between the multivalent cations and the various phosphate ions. Such phosphate-ion-containing digested alkaline tall oil pitch soap surfactant systems, and their preparation and use, are described more completely in the parent application Ser. No. 235,039 and those descriptions are incorporated herein by reference.

The properties of digested alkaline tall oil pitch soap compositions can be modified by using an alkali metal carbonate as some or all of the alkaline material with which the tall oil pitch is mixed and digested and/or some or all of the electrolytes that are dissolved in the aqueous liquid in which the digested alkaline tall oil pitch soap composition is dissolved to form an aqueous surfactant system. In an aqueous solution, a dibasic carbonate ion hydrolyzes in stages and the solution contains both divalent $CO_3^=$ and monovalent $HCO_3^-$ carbonate ions. The degree of hydrolysis depends on the pH and carbonate concentration of the solution. An advantageous reservoir oil displacing liquid comprises an aqueous surfactant system in which the surfactant consists essentially of a digested alkaline tall oil pitch soap composition and the system contains carbonate ions. The preparation and use of digested alkaline tall oil pitch soap compositions containing carbonate ions are described more completely in the parent application Ser. No. 235,088 and such descriptions are incorporated herein by reference.

Aqueous digested alkaline tall oil soap surfactant systems containing phosphate and/or carbonate anions are particularly advantageous in respect to being one or more of the following: (1) relatively immune to differences in the temperature at which the displacement is conducted (as compared with prior surfactant soap systems, which prior systems tend to exhibit significant differences in efficiency at different reservoir temperatures); (2) comparatively immune to differences in the composition of the oil to be displaced (relative to prior aqueous soap surfactant systems which prior systems tend to exhibit different efficiencies with different oil compositions); or (3) exhibiting a relatively high tolerance toward the multivalent cation content of water encountered within a reservoir (relative to prior aqueous surfactant soap systems which prior systems tend to form precipitates and/or gels in the presence of such cations).

Certain scale inhibitors can be utilized to increase the multivalent cation tolerance of an aqueous anionic surfactant system, such as one containing an aqueous digested alkaline tall oil pitch soap composition. Such an increase is effected by dissolving in the surfactant system at least one salt containing multivalent cataion-precipitating anions (such as a carbonate, sulfate, or phosphate salt) in combination with a crystal-growth-controlling scale inhibitor (such as certain organic or inorganic phosphates) which is substantially inert with respect to the surface activity of the surfactant system. Such a combination of solutes provides a dynamically inhibited surfactant system in which a relatively large amount of protection is provided by a relatively small amount of additive. A particularly suitable combination of precipitation-initiating and scale-inhibiting materials comprises sodium carbonate and the salt of a phosphonic acid-substituted amine, such as the tris (methyl phosphonate) amines available under the tradename of Dequest, from Monsanto Chemical Company.

Organic solvents can be incorporated in the present digested alkaline tall oil pitch soap compositions to increase their tolerance to multivalent cations. Such solvents can be mixed with the tall oil pitch prior to the digestion. Such solvents in concentrations in the order of 2-20% by volume of the pitch-solvent solution, appear to increase the solubility of multivalent cation in the present type of pitch soap composition. Examples of suitable solvents include pine oil, such a Arizole Pine Oil, containing 80% terpene alcohols, acetone, crude oil, kerosene, and toluene, available from ordinary commercial sources, etc.

Co-surfactant materials can be incorporated in the present aqueous digested alkaline tall oil pitch soap surfactant systems to increase their tolerance to both monovalent and multivalent cations. Where the temperature of the reservoir in which the oil is to be displaced is suitably low, a polyalkoxylated aliphatic alcohol sulfate surfactant, such as Neodol 25-3S (available from Shell Chemical Company) can be used. Examples of other suitable co-surfactants include polyalkoxy aromatic alcohol surfactants such as those available under the tradename Igepal (nonylphenoxypolyethyleneoxyethanol), available from GAF Corporation, etc. Phosphate ester surfactants such as those available under the tradename "Klearfac" from Wyandotte Chemical Co., etc. Such co-surfactant materials appear to be effective by a dispersion mechanism and thus provide a relatively high degree of tolerance from a relatively small amount of additive.

Chelating agents that are adapted to isolate multivalent cations in the form of water-soluble complex ions and are substantially inert with respect to the surface activity of the surfactant system, can be dissolved in aqueous alkaline digested tall oil pitch soap surfactant sustems to increase their tolerance to multivalent cations. Examples of suitable chelating agents include ethelynediaminetetracetic acid materials, such as those available as Cheelox from the GAF Corporation. The ethelyndiaminetetra acetic acid chelating agents can be utilized at temperatures which would be unsuitable for an alkoxy alcohol sulfate co-surfactant such as a Neodol sulfate.

The relatively wide range of property variations that can be imparted to the present aqueous digested alkaline tall oil pitch soap surfactant systems adapt them for use in processes that are tailored to suit the particular field location and reservoir in which an oil displacement operation is to be effected. For example, one or more batches of stock pitch soap compositions can be prepared so that they have substantially consistent properties. This may require pretreatments and/or additives to smooth out or normalize the variations that are common in a series of batches of tall oil pitch. For example, a fatty acid-dimerizing pretreatment and/or additions or organic solvents and uses of selected alkalies, such as phosphates, during or subsequent to the digestion, can be utilized. Such stock compositions can be prepared by digesting a mixture of about 1 part tall oil pitch and 3 parts of a sodium hydroxide solution that contains about 0.0045 part sodium hydroxide per part of liquid for about 16 hours at 200°F. under 100 psi (preferably in a non-oxydizing atmosphere, such as a nitrogen atmosphere). Such a stock composition is homogeneous and has a viscosity which increases with time, during room temperature storage, but which, on warming, thins to a liquid to which further additions or dilutions can readily be made. With such stock compositions available, it is advantageous to determine conditions such as the reservoir temperature, the effective viscosity of the reservoir oil, the salinity of the water in the reservoir and the salinity of the water available near the reservoir for use in a water-flooding operation, etc. particularly, in an oil-displacing operation in which the oil is displaced to production locations, it is both feasible and advantageous to adjust the composition of an aqueous surfactant system in which the surfactant material consists essentially of a digested alkaline tall oil pitch soap composition with respect to field location properties to decrease the cost of a surfactant system that is effective in displacing the oil in that particular reservoir. As will be apparent to those skilled in the art, such adjustments will include the additions of various anions, solvents, scale inhibitors, co-surfactants, chelating agents, water-thickening materials (which can suitably be partially hydrolyzed, polyacrylamide polymers, polysacarides, modified celluloses, or the like) which are substantially inert with respect to the surface activity of the system.

EXAMLPES

Figure 1:
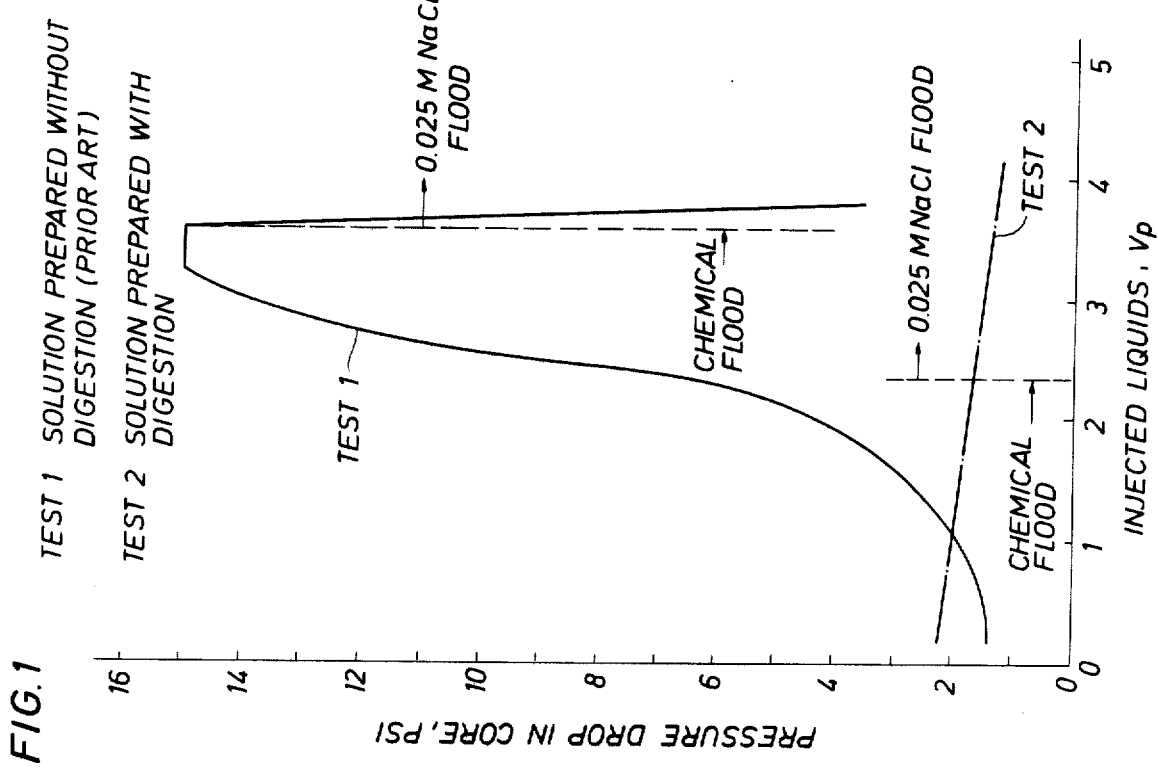
FIG. 1 is a plot of pressure with amount of fluid injected.

Tests 1 and 2 show a comparison of the pressure behavior of an aqueous surfactant system containing a digested alkaline tall oil pitch soap (Test 1) and an otherwise similar system containing a digested alkaline tall oil pitch soap of the present invention (Test 2). The systems were tested in an oil recovery experiment in a Berea sandstone core, at 70°C. containing Benton crude at a residual oil saturation. In such experiments the core is flooded with oil, water-flooded until no more oil is produced, chemically flooded by injecting the specified surfactant system, and, finally waterflooded with a 0.025 molar sodium chloride solution- using a fluid injection rate equivalent to about 1-foot per day against a backpressure of 10 psi. In Test 2, an Acintol tall oil pitch as digested with enough sodium hydroxide solution (containing 15 milligrams per milliliter of sodium hydroxide) to provide 42 milligrams of sodium hydroxide per gram of pitch (40% excess of stoichiometric) at 70°C. for four hours. In Test 1 the soap was neutralized with 30 milligrams of sodium hydroxide per gram of pitch (stoichiometric) at 70°C. without substantial reaction time. The resulting soaps were injected without filtration and the results are shown in FIG. 1. The low pressure drop exhibited by Test 2 indicates the absence of any permeability impairment.

Tests 3 to 5 compare amounts of oil reduction (in terms of percent of the pore volume of a core of the type described above) per increment of injected liquid. Three digested alkaline tall oil pitch soap compositions were prepared by digesting mixtures of the pitch with the indicated amounts of aqueous alkali (under conditions indicated above) and dissolving the resultant pitch soap compositions in enough aqueous liquid to form aqueous surfactant systems containing 10% by weight of pitch and the indicated number of moles of sodium chloride. The results are shown in FIG. 2. The oil recovery efficiency increases with increases in excess alkali. As known to those skilled in the art, an increase in the concentration of sodium chloride in the range of 0.36 moles to 0.54 moles, by itself, causes substantially no increase in the oil displacement efficiency of an aqueous solution. The results are shown in FIG. 2.

Figure 3:
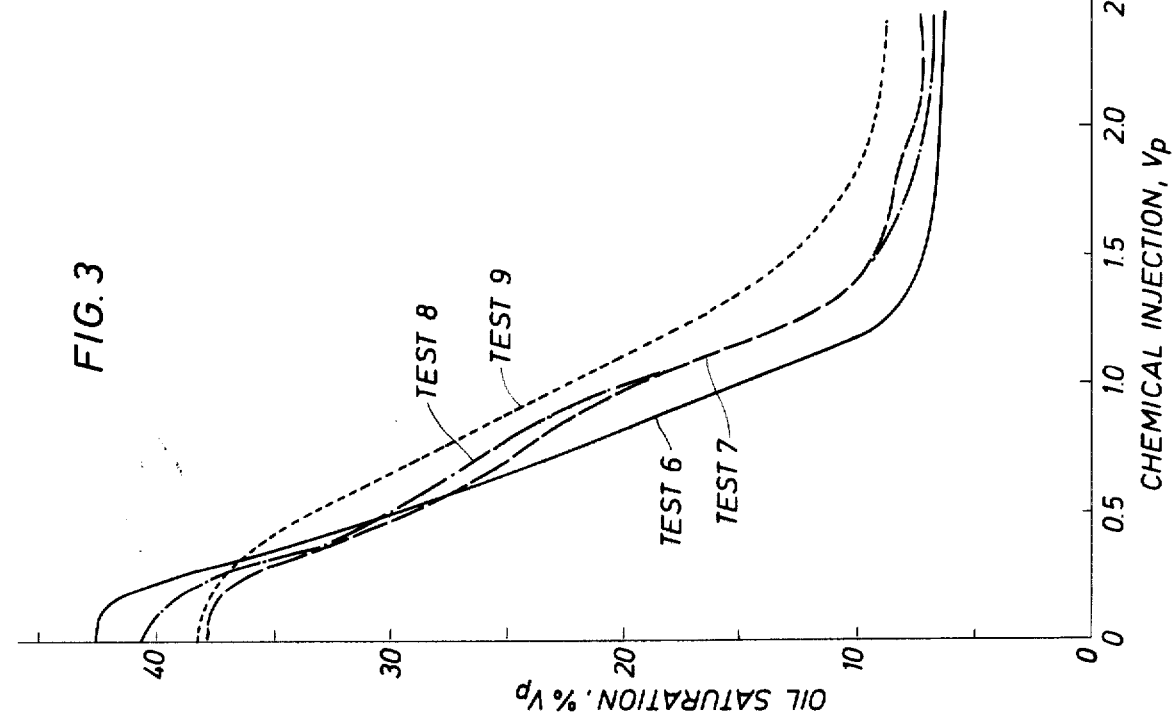

Tests 6 to 9 compare the oil displacement efficiencies of otherwise similar aqueous digested alkaline tall oil pitch soap surfactant systems in which the mixtures of pitch and aqueous alkali were digested for different times and/or temperatures. The Test results are shown in FIG. 3. The digestion conditions and components of the surfactant systems ("chemical slugs") are listed in Table 1.

Note that test 9 indicates that a tolerance to an aqueous solution of 1 molar sodium chloride (containing about 58,000 parts per million sodium chloride) can be obtained by digesting the pitch-alkali mixture at 110°C. The mixture was digested as described above for thirty minutes at 70°C., then digested in a bomb at 110°C. under 100 psi nitrogen pressure. Similar tests indicated that further increases in the digestion temperature for the same length of time tended to reduce the total solubility of the digested material by causing it to form a layer of finely-dispersed insoluble material on the top of an aqueous solution. As indicated in FIG. 3, the oil recovery efficiency of such systems is relatively insensitive to the severity of the digestion, at temperatures above 90°C.

Tests 10 to 14 compare the oil displacement efficiencies of aqueous digested alkaline tall oil pitch surfactant systems (or slugs) containing different dissolved electrolytes. The pitch soap compositions were prepared substantially as in test 2 and were dissolved in enough water to form a 10% by weight tall oil pitch surfactant systems containing the indicated molar amounts of the indicated salts. In such tests, the initial oil saturation values can appropriately be disregarded since they are consistently from about 38 to 42% pore volume and have little effect on the percent oil recovered. The best results are shown in Table 2.

In tests of the type shown in Table 2, a reduction of the oil saturation to about 15% during the injection of one pore volume is commonly attained with otherwise similar surfactant systems containing sodium chloride as the electrolyte. Thus, significant improvements are shown by the slugs containing sodium acetate, sodium fluoride, and sodium sulfate. In general, it has been found that the use of sodium sulfate and sodium fluoride provide the highest monovalent salt tolerance as well as better buffer action, oil recovery and multivalent cation tolerance.

Table 1

CHEMICAL SLUGS* INJECTED FOR CORE EXPERIMENTS SHOWN IN FIG. 3

| Test No. | Temp. and Time of Digestion | | Conc. of NaCl, M | Phase Separation of Slug (M. NaCl) |
|---|---|---|---|---|
| 6 | 70°C | 4 hrs | 0.56 | 0.68 |
| 7 | 93°C | 16 hrs | 0.84 | 0.96 |
| 8 | 100°C | 16 hrs | 0.86 | 1.00 |
| 9 | 110°C | 16 hrs | 1.00 | 1.20 |

*All slugs contain 10 percent Acintol pitch (9/29/71) and 0.45 percent NaOH (40% excess repitch acid number).

Table 2

OIL RECOVERY WITH 10 PERCENT TALL OIL PITCH SYSTEMS IN ELECTROLYTE SOLUTIONS CONTAINING DIFFERENT ANIONS

| Test Number Electrolyte | 10 0.56 M NaCl | 11 0.54 M NaBr | 12 0.48 M NaAc | 13 0.13 M NaF 0.42 M NaCl | 14 0.41 M $Na_2SO_4$ |
|---|---|---|---|---|---|
| Oil Saturation (% $V_p$) at Different Chemical Injection ($V_p$) | | | | | |
| 0.0 | 42.4 | 40.8 | 41.3 | 40.4 | |
| 0.2 | 40.3 | 39.5 | 39.2 | 38.1 | 39.2 |
| 0.4 | 33.8 | 33.8 | 32.5 | 31.1 | 31.9 |
| 0.6 | 27.9 | 28.1 | 26.0 | 24.0 | 25.6 |
| 0.8 | 21.2 | 21.5 | 19.4 | 17.6 | 19.2 |
| 1.0 | 15.0 | 14.7 | 12.7 | 12.4 | 10.9 |
| 1.2 | 9.2 | 10.2 | 9.6 | 10.7 | 6.9 |
| Residual | 6.1 | 6.6 | 5.1 | 8.2 | 4.8 |

*All experiments were performed at 70°C with Benton crude oil.

Tests 15 and 16 compare the oil recovery efficiency of otherwise substantially equivalent aqueous digested alkaline tall oil pitch surfactant systems in which the pitch was neutralized by sodium hydroxide (test 15) and by sodium phosphate (test 16). The test conditions and results are listed in Table 3:

Table 3

SUMMARY OF CORE EXPERIMENTS USING 10% TALL OIL PITCH
COMPOSITIONS NEUTRALIZED BY NaOH AND $Na_3PO_4$

| Alkali Used in Neutralization | Test 15 NaOH | Test 16 $Na_3PO_4$ |
|---|---|---|
| pH Change of Chemical Slug Passing Through Core | Considerable | Slight |
| Performance in the Absence of Field Water | | |
| Maximum Pressure Drop, psi | 1.1 | 1.2 |
| Initial Oil Saturation, % $V_p$ | 39.6 | 40.6 |

Table 3 — Continued

SUMMARY OF CORE EXPERIMENTS USING 10% TALL OIL PITCH
COMPOSITIONS NEUTRALIZED BY NaOH AND $Na_3PO_4$

| Alkali Used in Neutralization | Test 15 NaOH | Test 16 $Na_3PO_4$ |
|---|---|---|
| Remaining Oil Saturation at 1PV, % $V_p$ | 15.0 | 9.9 |
| Final Residual Oil Saturation, % $V_p$ | 5.0 | 4.3 |
| Performance in the Presence of Field Water | | |
| Maximum Pressure Drop, psi | 12.0 | 1.4 |
| Initial Oil Saturation | 40.2 | 39.2 |
| Remaining Oil Saturation at 1 PV, % $V_p$ | 24.3 | 12.8 |
| Final Residual Oil Saturation, % $V_p$ | 7.5 | 2.9 |

Notes:
1. Core = Berea sandstone, 10 inches long, 2 inches in diameter.
2. Crude oil = Benton.
3. Back pressure = 10 psi.
4. Temperature = 70°C.
5. Field water = 5% Eugene Island synthetic water.
6. Eugene Island synthetic water: Containing 45,337 ppm $Na^+$, 3741 ppm $Ca^{++}$, 1115 ppm $Mg^{++}$, 756 ppm $Ba^{++}$ and 69,651 ppm $Cl^-$.
7. Tall oil pitch: Arizona Chemical Company, 8/4/70.
8. Chemical slug was injected directly without filtration.

In comparable tests it has been shown that an aqueous surfactant system containing 10% by weight of an undigested mixture of tall oil pitch and a substantially stoichiometric proportion of sodium hydroxide (about 30 milligrams per gram of pitch) reduces the oil saturation to about 20% by the time one pore volume of liquid has been injected. On the other hand, an analagous system containing a digested mixture of 42 milligrams sodium hydroxide per gram of pitch, reduces the oil saturation to 15% during a similar injection. However, as shown in Table 3, in test 16, in which the surfactant is a digested mixture of tall oil pitch and an amount of sodium phosphate equivalent to 42 milligrams of sodium hydroxide per gram of pitch, the oil saturation was reduced to 9.9%.

Tests 17 to 23 compare the oil displacement efficiencies of otherwise similar aqueous digested alkaline tall oil pitch surfactant systems in which the alkali and salt concentrations are indicated in Table 4.

Table 4

CHEMICAL FLOOD IN BEREA CORE CONTAINING BENTON CRUDE WITH 10% TALL OIL PITCH NEUTRALIZED WITH $Na_2CO_3$ AT 70°C

| Alkali and salt con. of the chemical slug Oil Saturation, % $V_p$ At Different $V_p$ of Chemical Injection | Test 17 0.08M $Na_2CO_3$ + 0.2M NaCl | Test 18 0.1M $Na_2CO_3$ + 0.2M NaCl | Test 19 0.1M $Na_2CO_3$ + 0.01M NaOH + 0.24M NaCl | Test 20 0.12M $Na_2CO_3$ + 0.2M NaCl | Test 21 0.15M $Na_2CO_3$ + 0.16M NaCl | Test 22 0.2M $Na_2CO_3$ + 0.12M NaCl | Test 23 0.3M $Na_2CO_3$ + 0.0M NaCl |
|---|---|---|---|---|---|---|---|
| 0.0 | 39.3 | 40.3 | 39.5 | 39.3 | 39.0 | 39.9 | 37.9 |
| 0.2 | 39.0 | 39.1 | 38.2 | 37.7 | 39.2 | 39.3 | 36.2 |
| 0.4 | 32.4 | 33.1 | 31.7 | 31.7 | 32.1 | 31.6 | 28.8 |
| 0.6 | 26.3 | 27.0 | 25.6 | 25.6 | 25.4 | 24.7 | 20.1 |
| 0.8 | 22.2 | 21.0 | 18.5 | 18.5 | 17.5 | 16.3 | 12.2 |
| 1.0 | 14.9 | 12.3 | 11.0 | 10.9 | 11.6 | 10.1 | 8.9 |
| 1.2 | 9.6 | 9.1 | 7.4 | 7.8 | 10.0 | 9.1 | 8.0 |
| 1.4 | 7.2 | 8.1 | 6.4 | 6.9 | 8.9 | 7.9 | 7.5 |
| 1.6 | 6.6 | 7.2 | 6.0 | 6.1 | 8.2 | 7.3 | 7.2 |
| 1.8 | 6.0 | 6.7 | 5.7 | 5.5 | 7.7 | 6.9 | 7.0 |
| 2.0 | 5.5 | 6.1 | 5.6 | 5.1 | 7.0 | 6.5 | 6.9 |
| At the End of 0.025M NaCl Flood | 5.0 | 5.5 | 5.2 | 4.2 | 5.5 | 5.0 | 6.2 |
| pH of Slug | 9.3 | 9.5 | 9.8 | 9.9 | 9.8 | 9.9 | 10.3 |

Note that the oil displacement efficiency increases with increasing carbonate concentration. In addition, the proportion of neutral salts needed to provide an active surfactant system, decreases with increasing carbonate concentration. The latter results indicate that the sodium carbonate exhibits a dual function. It acts both as a base that neutralizes the tall oil pitch acids to form the soap and an electrolyte that increases the surface activity of the aqueous surfactant system.

Figure 4:
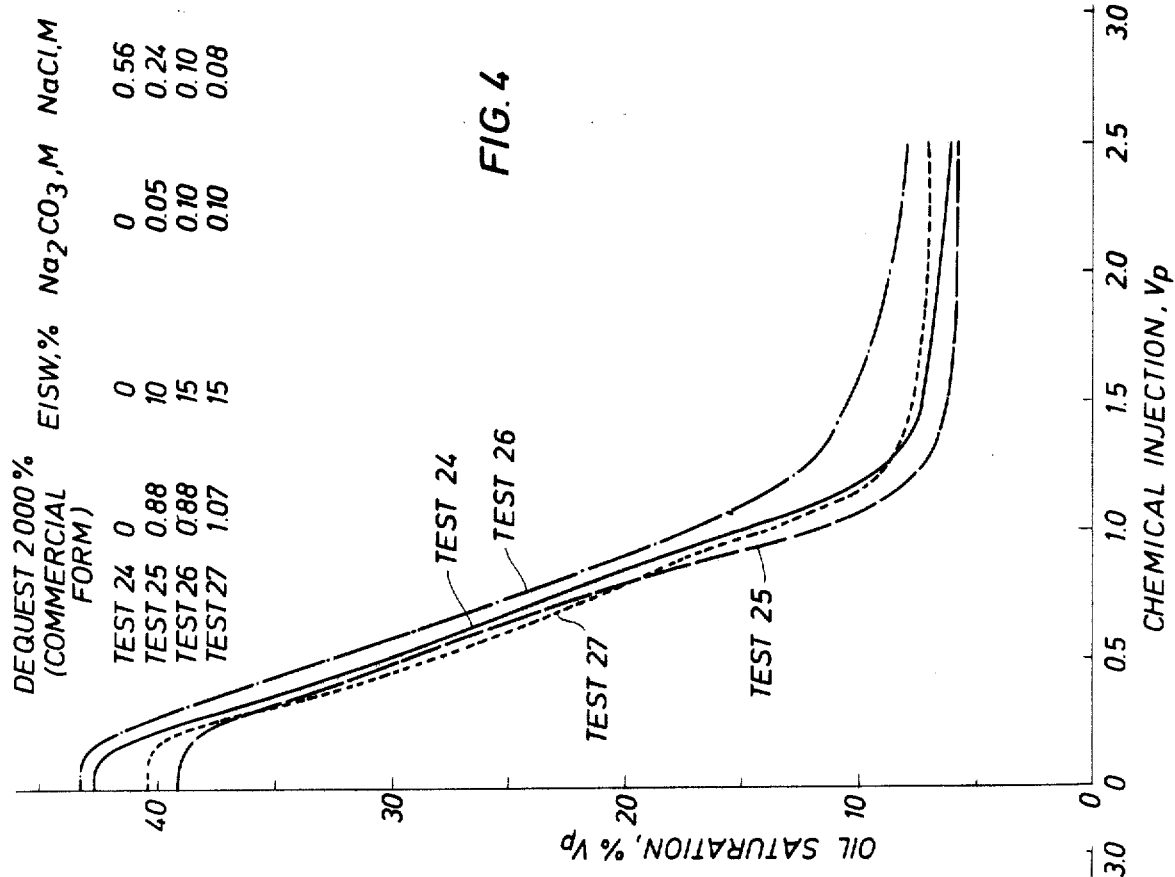

Tests 24 to 27 compare the oil displacing efficiencies of aqueous digested alkaline tall oil pitch soap surfactant systems with and without the presence of a scale inhibitor combination of anions that precipitate multivalent cations, multivalent cations and a scale inhibitor. The surfactant systems are essentially similar except for the presence of the indicated amount of the sodium salt of the scale inhibitor, Dequest 2006, and Eugene Island synthetic water. The test results are shown in FIG. 4. Note that the so-inhibited surfactant systems became tolerant to the rather high concentrations of monovalent and multivalent cations - amounts that would cause a coagulation of similar surfactant systems that were free of the precipitate-forming and scale-inhibiting combination. The pressure drops in cores observed during those tests were similar to those of surfactant systems free of the scale-inhibitor and multivalent cations.

Tests 28 to 30 compare the particle size distributions of liquids in which calcium carbonate was precipitated in the presence and in the absence of a Dequest scale inhibitor. In test 28 equal volumes of 0.1 molar sodium carbonate were added to an aqueous 0.1 molar calcium chloride solution containing $3 \times 10^{-3}$ moles of Dequest 2000 with stirring. The solution was then diluted to 0.1 of its concentration with aqueous 0.1 mole sodium chloride and promptly analyzed. In test 29 a solution was similarly prepared—without Dequest. In test 30 a solution was similarly prepared but with $4 \times 10^{-3}$ moles of Dequest, and was subjected to about 3-weeks aging at room temperature prior to its analysis. The analysis employed a commercially available Coulter Counter (Model T) which measures the change in the resistance of a conducting fluid that occurs as a nonconducting particle flows through a small aperture between two electrodes. When a particle passes through the aperture, the change in resistance produces a voltage pulse which (in theory) is proportional to the volume of the particle. The test results are shown in FIG. 5. Note that without the Dequest the particle size grows to more than the maximum size measured after a three-week aging period. In contrast, with the Dequest, the particle size remains relatively very small throughout a three-week aging period.

Tests 31 to 37 compare the oil displacement efficiencies of otherwise generally similar aqueous digested alkaline tall oil pitch soap surfactant systems, with and without an acid-dimerizing pretreatment of the tall oil pitch. Note that test 37, using the dimerized pitch, provided a first pore volume of injected fluid recovery of oil amounting to 32 % of the core pore volume; whereas test 31, using the same pitch without pretreatment, recovered only 25.5% pore volume. There was relatively less changes between the performances of tests 31 to 36, although--based on the examples of the pitches used, there was a trend towards greater recovery with greater acid dimerization in the pitches as received from the suppliers.

Table 5

OIL RECOVERY* BY USING DIFFERENT TALL OIL PITCH SOAPS

| Sample | Acintol (9/29/71) | Acintol Pitch (8/4/70) | Pamak TP | Unitol DP | Glidden Pitch | Emtall 906 | Acinol (9/29/71) 260 C. 300 |
|---|---|---|---|---|---|---|---|
| Test No. | 31 | 32 | 33 | 34 | 35 | 36 | 37 |
| NaOH, mg/g pitch | 37.5 | 42 | 30 | 45 | 48 | 52.5 | 57.0 |
| NaCl, M | 0.36 | 0.54 | 0.22 | 0.32 | 0.36 | 0.44 | 0.32 |
| Oil Saturation, % $V_p$ | | | | | | | |
| Initial | 40.1 | 39.6 | 39.3 | 39.2 | 39.5 | 39.1 | 39.3 |
| at 1 PV Chem. Injection | 14.6 | 15.0 | 12.7 | 12.0 | 10.5 | 9.7 | 7.3 |
| Final | 6.5 | 5.3 | 1.7 | 8.0 | 2.9 | 4.8 | 4.8 |

Table 5 – Continued

OIL RECOVERY* BY USING DIFFERENT TALL OIL PITCH SOAPS

| Sample | Acintol (9/29/71) | Acintol Pitch (8/4/70) | Pamak TP | Unitol DP | Glidden Pitch | Emtall 906 | Acinol (9/29/71) 260 C. 300 |
|---|---|---|---|---|---|---|---|
| Oil Recovery/1st PV Chem. Injection S, % $V_p$ | 25.5 | 24.6 | 26.6 | 27.2 | 29.0 | 29.4 Only One Run | 32.0 |
| Average (Oil Recovery/1st PV Chem. Injection) For Several runs, % $V_p$ | 26±1 | 25±1 | 27±1 | 28±1 | 29±1 | | |

*Oil recovery experiments were performed with Benton crude oil at 70°C in Berea sandstone core, 10 inches long and 2.0 inches in diameter.

Tests 38 and 39 compare the oil displacement efficiencies of aqueous digested alkaline tall oil pitch surfactant systems similar to those of test 2 except for the indicated amount of organic solvents and Eugene Island synthetic water. The compositions of the tested surfactant systems are listed in Table 6:

TABLE 6

COMPOSITION OF TALL OIL PITCH SLUGS

| | Test 38 | Test 39 |
|---|---|---|
| Weight of Pitch (Acintol 9/29/71) | 1.5 g | 2.0 g |
| NaOH (15 mg/ml) | 4.5 ml | 6.0 ml |
| Organic Additive | 0.1 ml (Acetone (Shipps)) | 0.2 ml pine oil (Arizole) |
| NaCl, 4M | 1.6 ml | 0.6 ml |
| Distilled $H_2O$ | 1.8 ml | 0.75 ml |
| EISW* (Eugene Island Synthetic Water) | 0.5 ml | 0.5 ml |
| Total Volume | 10 ml | 10.05 ml |

*The chemical slugs contain 280 ppm divalent cations.

In test 38, an injection of 1 pore volume of the surfactant system reduced the oil saturation to about 14.3%. In test 39 a similar injection reduced the oil saturation to about 6%. These slugs remained homogeneous and effective in the presence of 5% of the Eugene Island synthetic water. They exhibited a relatively high viscosity, which indicates that organic solvents can be utilized to provide relatively highly viscous surfactant systems, and thus reduce or eliminate the need for the addition of a water-thickener, such as a partially hydrolyzed polyacrylamide.

Test 40 shows the ability of a co-surfactant to enhance the salt tolerance of an aqueous digested alkaline tall oil pitch soap surfactant system. A system containing 10% by weight of actinol tall oil pitch, 0.075 moles sodium phosphate, 0.75% Igepal CO-990 (containing 95% ethylene oxide) and 0.48 moles sodium chloride; (11,000 parts per million sodium cation) had reduced the oil saturation to about 18% by the end of a one pore volume fluid injection.

Tests 41 and 42 show the oil recovery efficiencies of aqueous digested alkaline tall oil pitch soap surfactant systems containing a chelating agent and, respectively, 10 and 15% Eugene Island synthetic Water. The composition of the surfactant systems are shown in Table 7. In test 41, a one pore volume injection of fluid reduced the oil saturation to 10%, and in test 42 the saturation was reduced to 17%. The pressure drops were normal during both injections. The chelating agent used was Cheelox BF-13, a product of GAF Corporation (an alkaline solution containing about 38% ethylenediaminetetraacetic acid). Such typical recoveries with typical surfactant systems (of the present invention) in the presence of significant proportions of multivalent cations indicates that chelating agents can be utilized to enhance multivalent cation tolerance, without reducing the activity of the present aqueous digested alkaline tall oil pitch surfactant systems.

TABLE 7

COMPOSITION OF SLUGS USED IN CORE EXPERIMENT

| | Test 41 | Test 42 |
|---|---|---|
| Pitch (Acintol Pitch 9/29/71- Specific Gravity 1.01) | 1g | 1g |
| NaOH (15 mg/ml) | 3 ml | 2.8 ml |
| NaCl (2M) | 1.6 ml | 1.5 ml |
| Cheelox BF-13 | 0.2 ml | 0.2 ml |
| Eugene Island Synthetic Water | 1 ml | 1.5 ml |
| Distilled Water | 3.2 ml | 3.3 ml |
| Total Volume | 10 ml | 10.3 ml |
| Digestion of Pitch | 4 hrs at 70°C | 67 hrs at 70°C |

Test 43 illustrates the filterability that is provided by the digestion of a mixture of tall oil pitch and aqueous alkali. It was found that standard millipore filters would operate with aqueous tall oil pitch soap surfactant systems for several minutes of contact and, by using a 40–70 psi pressure differential, small amounts could be filtered. Attempts were made to filter an undigested tall oil pitch soap that was otherwise similar to the digested system of test 2. In each case, filtration was impossible. The filter was immediately plugged before a single drop of filtrate would be obtained (through a five micron millipore filter operated at 70 psi differential). In contrast, when such a pitch system was predigested with the alkali, it was frequently possible to filter as much as two or three hundred millimeters through one filter before it became plugged (by a combination of a screened-out precipitate from the system, and the swelling of the solid framework of the filter material due to its chemical interaction with the system). In the latter case, the plugging material was predominately inorganic whereas in the former case it was predominately organic. The alkali digestion is believed to be an important step in developing an aqueous tall oil pitch soap surfactant system that is suitable for injection into a subterranean reservoir.

In substantially any oil-displacing operation, and particularly where the oil is displaced from near an injection location toward an oil production location, it may be desirable to inject a slug of the present aqueous digested alkaline tall oil pitch surfactant system ahead of an aqueous drive liquid. Such a drive liquid can be substantially any locally available water, preferably one that is relatively cheap. Where the oil to be displaced is relatively viscous, it is desirable to increase the viscosity of the surfactant system to provide a surfactant to oil mobility ratio conductive to an efficient oil-displacement. This can be effected by using a relatively high concentration of the present pitch soap composition (e.g., at least about 10% by weight) and/or adding a viscosity increasing material, such as a partially hydrolyzed polyacrylamide or biopolymer or the like, to the surfactant system. Where such an expedient is used it may be desirable to reduce the viscosity enhancing concentrations within portions of the surfactant system moving from front to rear within the injected slug. This provides a favorable mobility ratio between the rear of the slug and front of the drive water. Where desirable, bactericides, clay stabilizers, etc., can be added to the present surfactant systems and/or any aqueous liquids that are used to displace them as long as such components are substantially inert with respect to the surface activity of the surfactant system.

What is claimed is:

1. A digested alkaline tall oil pitch soap composition, which comprises a digestion product produced by:

mixing each part by weight of tall oil pitch with from about 1-5 parts by weight of an aqueous solution of an alkaline material that is substantially free of multivalent cations which form water-insoluble salts of fatty acids selected from the group consisting of alkali metal and ammonium hydroxides, carbonates, phosphates, fluorides and borates and alkali metal and ammonium salts of lower molecular weight carboxylic acids, said solution containing an amount of dissolved monovalent cationic alkaline material providing an excess alkalinity, relative to the acid number of the pitch, of from about 20 to 80%, and;

heating the mixture for time and temperature equivalent to from about 4 hours at 70°C to about 16 hours at 110°C.

2. The composition of claim 1 in which said dissolved monovalent cationic alkaline material includes a proportion of sodium hydroxide.

3. The composition of claim 1 in which said dissolved monovalent cationic alkaline material includes a proportion of alkali metal phosphate effective for enhancing oil recovery and tolerance for salts of monovalent cations.

4. The composition of claim 1 in which said dissolved monovalent cationic alkaline material includes a proportion of ammonium hydroxide effective for enhancing oil recovery and buffering properties of said pitch soap composition.

5. The composition of claim 1 in which said dissolved monovalent cationic alkaline material includes a proportion of alkali metal borate effective for enhancing buffering properties of said pitch soap composition.

6. The composition of claim 1 in which said tall oil pitch is subjected to a fatty acid dimerizing pretreatment prior to said digestion.

7. The composition of claim 1 in which said tall oil pitch is mixed with a proportion of liquid organic solvent selected from the group consisting of pine oil, acetone, crude oil, kerosene, and toluene effective for enhancing tolerance to multivalent cations prior to said digestion.

8. An aqueous digested alkaline tall oil pitch soap surfactant system, which comprises:

an aqueous liquid solution containing enough substantially neutral electrolyte and surfactant to form an active surfactant system having an interfacial tension against oil of less than about 0.01 dyne per centimeter; and said surfactant is a material consisting essentially of a digested alkaline tall oil pitch soap composition produced by heating a mixture of tall oil pitch and enough aqueous alkaline material to provide an excess of from about 20 to 80%, relative to the acid number of the pitch, for a time and temperature that is substantially equivalent to from about 4 hours at 70°C to about 16 hours at 110°C, where said heating yields a substantially completely water soluble digestion product, and where said aqueous alkaline material is a water solution of an or alkaline material that is substantially free of multivalent cations that form water-insoluble salts of fatty acids and is selected from the group consisting of alkali metal and ammonium hydroxides, carbonates, phosphates, fluorides and borates and alkali metal and ammonium salts of lower molecular weight carboxylic acids.

9. The composition of claim 8 in which said surfactant is produced by:

mixing each part by weight of tall oil pitch with from about 1-5 parts by weight of an aqueous alkaline material.

* * * * *